(12) United States Patent
Fuse et al.

(10) Patent No.: US 9,187,321 B2
(45) Date of Patent: Nov. 17, 2015

(54) REACTOR

(71) Applicant: DENSO CORPORATION, Kariya, Aichi-pref. (JP)

(72) Inventors: Takuya Fuse, Nagoya (JP); Kazutoshi Kuwayama, Kariya (JP); Tadahiro Nakagawa, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 455 days.

(21) Appl. No.: 13/658,320

(22) Filed: Oct. 23, 2012

(65) Prior Publication Data

US 2013/0108516 A1    May 2, 2013

(30) Foreign Application Priority Data

Oct. 31, 2011  (JP) ................. 2011-239111

(51) Int. Cl.
  *B01J 19/30* (2006.01)
  *B01J 8/02* (2006.01)
  (Continued)

(52) U.S. Cl.
  CPC ............. *C01B 3/047* (2013.01); *B01J 8/0214* (2013.01); *B01J 8/0285* (2013.01); *B01J 8/0411* (2013.01);
  (Continued)

(58) Field of Classification Search
  CPC ............ B01J 8/00; B01J 8/001; B01J 8/0015; B01J 8/0065; B01J 8/02; B01J 8/0214; B01J 8/0285; B01J 8/0292; B01J 35/02; B01J 19/30; B01J 19/305; B01J 2208/00; B01J 2208/00008; B01J 2208/00017; B01J 2208/00106; B01J 2208/001015; B01J 2208/00141; B01J 2208/00389; B01J 2208/00398; B01J 2208/0053; B01J 2208/02; B01J 2208/0021; B01J 2208/023; B01J 2208/024; B01J 2208/025; B01J 2208/027;
  B01J 35/00; B01J 19/00; B01J 19/24; C01B 3/00; C01B 3/02; C01B 3/04; C01B 3/047; C01B 3/56; C01B 3/80; C01B 2203/04; C01B 2203/0415; C01B 2203/0425; C01B 2203/0465
  See application file for complete search history.

(56) References Cited

U.S. PATENT DOCUMENTS 4,617,182 A    10/1986 Brown et al.
5,652,278 A *  7/1997 Barker et al. ............. 521/155
(Continued)

FOREIGN PATENT DOCUMENTS

CN         1003366      2/1989
CN       101041418      9/2007
(Continued)

OTHER PUBLICATIONS

Fauth et al., CO2 Scrubbing with Novel Lithium Zirconate Sorbents, Prepr. Pap.-Am. Chem. Soc., Div. Fuel Chem., 2004, 49 (1), pp. 310 and 311.*

(Continued)

*Primary Examiner* — Natasha Young
(74) *Attorney, Agent, or Firm* — Harness, Dickey & Pierce, P.L.C.

(57) ABSTRACT

A reactor includes a reaction part and a removal part. The reaction part is configured to generate at least two products as a result of a reaction of an unreacted material. The removal part is configured to selectively occlude at least one product from the at least two products so as to separate and remove the at least one product. The removal part includes an absorbent and a cooling unit. The absorbent releases heat at time of the selective occlusion of the at least one product. The cooling unit is configured to remove the heat released by the absorbent.

8 Claims, 3 Drawing Sheets

(51) Int. Cl.
  *C01B 3/04* (2006.01)
  *C01B 3/56* (2006.01)
  *B01J 8/04* (2006.01)
  *B01J 8/06* (2006.01)
  *B01J 19/00* (2006.01)
  *B01J 19/24* (2006.01)
  *B01J 8/00* (2006.01)
  *B01J 35/00* (2006.01)
  *B01J 35/02* (2006.01)
  *C01B 3/00* (2006.01)
  *C01B 3/02* (2006.01)
  *C01B 3/50* (2006.01)
  *C01B 3/58* (2006.01)

(52) U.S. Cl.
  CPC ............... *B01J 8/0496* (2013.01); *B01J 8/067* (2013.01); *C01B 3/56* (2013.01); *B01J 2208/0053* (2013.01); *B01J 2208/00141* (2013.01); *B01J 2208/025* (2013.01); *C01B 2203/0425* (2013.01); *C01B 2203/0465* (2013.01); *Y02E 60/364* (2013.01)

(56) References Cited

U.S. PATENT DOCUMENTS

| | | | |
|---|---|---|---|
| 6,024,774 A * | 2/2000 | Nakagawa et al. | 48/198.3 |
| 2007/0224111 A1 | 9/2007 | Essaki et al. | |
| 2014/0248205 A1 | 9/2014 | Allam | |

FOREIGN PATENT DOCUMENTS

| | | |
|---|---|---|
| CN | 101041420 | 9/2007 |
| JP | 2003-119002 | 4/2003 |
| WO | WO 2011/150253 | 12/2011 |

OTHER PUBLICATIONS

Office action dated Mar. 17, 2014 in corresponding Chinese Application No. 2012 10425401.2.
Office Action dated Sep. 18, 2014 in corresponding Chinese Application No. 201210425401.2.
Office Action dated Feb. 13, 2015 in corresponding Chinese Application No. 201210425401.2.

* cited by examiner

REACTOR

CROSS REFERENCE TO RELATED APPLICATION

This application is based on Japanese Patent Application No. 2011-239111 filed on Oct. 31, 2011, the disclosure of which is incorporated herein by reference.

TECHNICAL FIELD

The present disclosure relates to a reactor that reacts an unreacted material to generate at least two products and separates and removes at least one product from the two products.

BACKGROUND

Conventionally, a fuel reformer which generates hydrogen from fuel and water vapor is known (see, for example, JP-A-2003-119002). A conventional technology described in JP-A-2003-119002 includes a structure by stacking in a multi-layer manner, for example, a fuel reforming catalyst layer which produces hydrogen through steam reforming of fuel, and a hydrogen permeable film through which hydrogen permeates selectively from gas having the hydrogen generated by the steam reforming as a main component.

According to this conventional technology, methanol (Me—OH) is used for the reformed fuel, and the hydrogen permeable film made of palladium alloy is disposed so as to face a gas passage through which the gas including hydrogen as a main component flows. A reaction formula for a reaction produced in the gas passage is expressed in the following chemical formula 1.

$$MeOH \rightarrow H_2 + CO \qquad \text{Chemical formula 1}$$

When hydrogen is separated through a hydrogen separating film, the above-expressed reaction is put into a state of non-equilibrium. Accordingly, the amount of hydrogen generated can be increased. Therefore, temperature of the above reaction can be reduced, and a reforming temperature can be lowered.

However, according to the above conventional technology described in JP-A-2003-119002, the hydrogen permeable film is used for a means for separating hydrogen from the gas (reformed gas) generated by reforming. Thus, given a strength of the film, a flow rate of the hydrogen separated from the reformed gas cannot be increased, and moreover, a pressure difference (differential pressure) between upstream and downstream sides of the film is difficult to secure. For this reason, in order to secure by their desired amount the flow rate of the hydrogen separated from the reformed gas and the differential pressure between the upstream and downstream sides of the film, it is necessary to increase an area of the hydrogen permeable film, and a size of the entire fuel reformer thereby increases.

In addition, according to the conventional technology of JP-A-2003-119002, since the hydrogen permeable film is fixed in a frame body, there needs to be the seal between the hydrogen permeable film and the frame body. The fuel reformer of the above conventional technology has a structure obtained by stacking the hydrogen permeable film, the fuel reforming catalyst layer and so forth in a multi-layer manner. As a result, a seal length becomes long. Thus, a lot of labor needs to be put into the sealing, and a production cost also becomes high. Furthermore, the palladium alloy which is an expensive precious metal is used for a material of the hydrogen permeable film. Therefore, the production cost becomes even higher.

SUMMARY

According to the present disclosure, there is provided a reactor including a reaction part and a removal part. The reaction part is configured to generate at least two products as a result of a reaction of an unreacted material. The removal part is configured to selectively occlude at least one product from the at least two products so as to separate and remove the at least one product. The removal part includes an absorbent and a cooling unit. The absorbent releases heat at time of the selective occlusion of the at least one product. The cooling unit is configured to remove the heat released by the absorbent.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
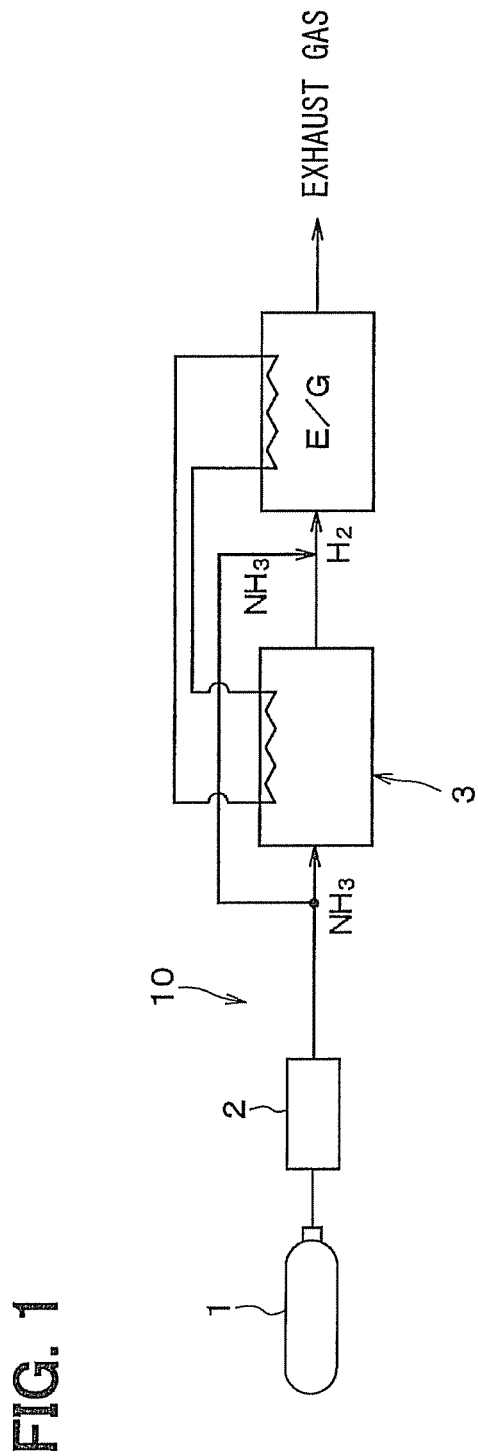
FIG. 1 is a diagram illustrating an entire configuration of a fuel supply system in accordance with an embodiment.

An embodiment will be described below in reference to FIGS. 1 to 3. In the present embodiment, a reactor of the present disclosure is applied to a fuel supply system 10. This fuel supply system 10 is applied to a vehicle, and supplies fuel to an engine (internal combustion engine) EG as an energy output unit that outputs driving force (mechanical energy) for vehicle traveling.

The fuel supply system 10 includes a high-pressure tank 1 as a liquid fuel storage means for storing pressurized and liquefied high-pressure liquid fuel.

Fuel, which molecule has at least one hydrogen atom, is employed for the fuel stored in this high-pressure tank 1. By employing the fuel, which molecule has at least one hydrogen atom, as fuel, hydrogen gas having flammability can be produced through reforming of fuel.

The fuel may have flammability in order that it can be combusted as fuel in the engine EG and furthermore, may be easily liquefied even at an ordinary temperature (approximately 15° C. to 25° C.) under high pressure to reduce its production costs.

Therefore, in the present embodiment, ammonia (NH3) is employed as the fuel which molecule has three hydrogen atoms and one nitrogen atom, which has flammability, and which liquefies at 1.5 MPa or lower even at ordinary temperatures.

In addition to this, dimethyl ether, alcohol-containing fuel, and so forth can be used as fuel which has equivalent characteristics. Furthermore, the fuel which contains hydrogen; which molecule has at least one atom of sulfur (S), oxygen (O), nitrogen (N), and halogen; and between which molecules a hydrogen bond develops, may be employed.

A fuel inflow port of a carburettor 2 is connected to a fuel outflow port of the high-pressure tank 1. The carburettor 2 is a gasification means for gasifying the fuel (liquid fuel) in a liquid phase state flowing out of the high-pressure tank 1.

The fuel (gaseous fuel) in a gaseous phase state gasified by the carburettor 2 flows out of a fuel outflow port of the carburettor 2. A flow of the gaseous fuel flowing out of the carburettor 2 branches between two flows. One branched gaseous fuel flows into a fuel injection valve (injector) that injects and supplies gaseous fuel into a combustion chamber of the engine EG. The other branched gaseous fuel flows into a reformer 3 that reforms gaseous fuel to generate hydrogen gas.

The reformer 3 is a reforming means (reactor) for heating gaseous fuel to a reformable temperature under catalytic influence and for causing a reforming reaction to produce hydrogen gas. In the present embodiment, ammonia, which is hydrogen-containing fuel, is employed for the fuel. Thus, the fuel is heated to a range of 300° C. to 700° C., and the reforming reaction is thereby initiated under catalytic influence so as to generate hydrogen gas.

Figure 2:
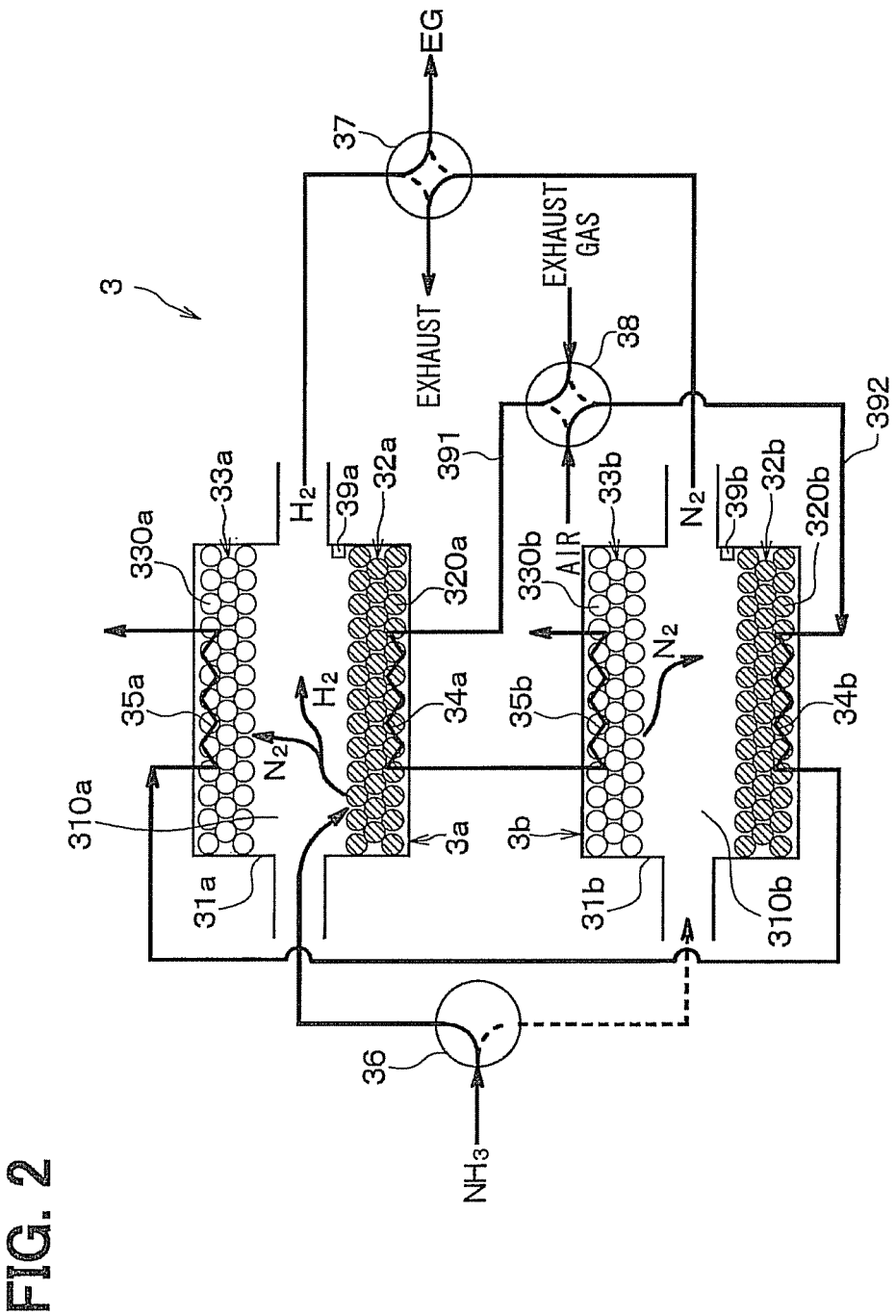
FIG. 2 is a schematic view illustrating a reformer according to the embodiment.

As illustrated in FIG. 2, the reformer 3 includes two reforming parts 3a, 3b. The reforming parts 3a, 3b respectively include fuel passage forming members 31a, 31b defining fuel passages 310a, 310b through which ammonia that is fuel as an unreacted material flows; reaction parts 32a, 32b that reform ammonia to produce two products of hydrogen and nitrogen; and removal parts 33a, 33b that remove nitrogen generated in the reaction parts 32a, 32b. Accordingly, the removal parts 33a, 33b are provided respectively for the reaction parts 32a, 326.

The reaction parts 32a, 32b respectively include catalysts 320a, 320b for reforming ammonia to produce hydrogen. The reaction parts 32a, 32b are disposed respectively in the fuel passages 310a, 310b. For this reason, the reforming parts 3a, 3b are configured respectively such that ammonia flowing through the fuel passages 310a, 310b is in contact with the catalysts 320a, 320b in the reaction parts 32a, 32b. Hydrogen and nitrogen generated in the reaction parts 32a, 32b are discharged respectively into the fuel passages 310a, 310b.

Reaction part side heat exchangers 34a, 34b that can heat or cool the catalysts 320a, 320b are provided respectively for the reaction parts 32a, 32b. These reaction part side heat exchangers 34a, 34b will be described in greater detail hereinafter.

The removal parts 33a, 33b separate and remove nitrogen by selectively occluding only nitrogen of hydrogen and nitrogen generated in the reaction parts 32a, 32b, respectively. In detail, the removal parts 33a, 33b respectively include absorbents 330a, 330b that selectively occlude nitrogen as a result of physical adsorption of nitrogen or fixation reaction of nitrogen.

By using, for instance, zeolite or activated carbon, for the absorbents 330a, 330b, nitrogen can be selectively occluded through the physical adsorption of nitrogen. By use of, for example, molybdenum as the absorbents 330a, 330b, nitrogen can be selectively occluded due to a molybdenum complexation reaction. These absorbents 330a, 330b release heat at the time of selective occlusion of nitrogen.

The removal, parts 33a, 33b are provided respectively in the fuel passages 310a, 310b. For this reason, the absorbents 330a, 330b of the reforming parts 3a, 3b are respectively in contact with hydrogen and nitrogen released from the reaction parts 32a, 32b into the fuel passages 310a, 310b.

Removal part side heat exchangers 35a, 35b that can heat or cool the absorbents 330a, 330b are provided respectively for the removal parts 33a, 33b. These removal part side heat exchangers 35a, 35b will be described in greater detail hereinafter.

An electric-type three-way valve 36 is connected to fuel inlet sides of the two reforming parts 3a, 3b. The electric-type three-way valve 36 is a passage switching means whose operation is controlled by a control voltage outputted from a control device (not shown).

Specifically, the electric-type three-way valve 36 includes three valves serving as an inlet, a first outlet, and a second outlet. The inlet of the electric-type three-way valve 36 is connected to the discharge side of the carburettor 2. The first outlet of the electric-type three-way valve 36 is connected to a fuel inlet side of one reforming part (hereinafter referred to as the first reforming part 3a) of the two reforming parts 3a, 3b. The second outlet of the electric-type three-way valve 36 is connected to a fuel inlet side of the other reforming part (hereinafter referred to as the second reforming part 3b) of the two reforming parts 3a, 3b.

The first outlet of the electric-type three-way valve 36 is opened and the second outlet of the valve 36 is closed, so that the fuel flowing out of the carburettor 2 enters only into the first reforming part 3a. On the other hand, by closing the first outlet of the electric-type three-way valve 36, and by opening the second outlet of the valve 36, the fuel flowing out of the carburettor 2 enters only into the second reforming part 3b.

A first electric-type four-way valve 37 is connected to discharge sides of the two reforming parts 3a, 3b. The first electric-type four-way valve 37 is a passage switching means whose operation is controlled by the control voltage outputted from the control device.

The first electric-type four-way valve 37 serves a function of switching between a first circuit that connects between the discharge side of the first reforming part 3a and the fuel inlet side of the engine EG (specifically, the injector), and between the discharge side of the second reforming part 3b and an exhaust port (not shown), at the same time; and a second circuit that connects between the discharge side of the first reforming part 3a and the exhaust port, and between the discharge side of the second reforming part 3b and the fuel inlet side of the engine EG at the same time.

A heat medium for heating or a heat medium for cooling (hereinafter referred also to simply as a heat medium) can flow through the reaction part side heat exchangers 34a, 34b and the removal part side heat exchangers 35a, 35b. In the present embodiment, the exhaust gas of the engine EG as the heat medium for heating is employed, and air is employed as the heat medium for cooling.

The reformer 3 includes a first heat medium circuit 391 that connects a heat medium discharge side of the reaction part side heat exchanger 34a in the first reforming part 3a (hereinafter referred to as the first reaction part side heat exchanger 34a), and a heat medium inlet side of the removal part side heat exchanger 35b in the second reforming part 3b; and a second heat medium circuit 392 that connects a heat medium discharge side of the reaction part side heat exchanger 34b in the second reforming part 3b (hereinafter referred to as the second reaction part side heat exchanger 34b), and a heat medium inlet side of the removal part side heat exchanger 35a in the first reforming part 3a.

A second electric-type four-way valve 38 is connected to a heat medium inlet side of the first reaction part side heat exchanger 34a along the first heat medium circuit 391, and a heat medium inlet side of the second reaction part side heat exchanger 34b along the second heat medium circuit 392. The second electric-type four-way valve 38 is a circuit switching means whose operation is controlled by the control voltage outputted from the control device.

The second electric-type four-way valve 38 serves a function of switching between a first circuit that connects between a heat medium inlet side of the first reaction part side heat exchanger 34a of the first heat medium circuit 391 and an exhaust gas outlet side of the engine EG, and between a heat medium inlet side of the second reaction part side heat exchanger 34b of the second heat medium circuit 392 and an air inflow port (not shown) at the same time; and a second circuit that connects between the heat medium inlet side of the first reaction part side heat exchanger 34a of the first heat medium circuit 391 and the air inflow port, and between the heat medium inlet side of the second reaction part side heat exchanger 34b of the second heat medium circuit 392 and the exhaust gas outlet side of the engine EG at the same time.

Accordingly, through control of the second electric-type four-way valve 38, the heat medium circulating along the first heat medium circuit 391 and the second heat medium circuit 392 can be switched between exhaust gas and air. A heat medium out of exhaust gas and air circulating through the first heat medium circuit 391 and a heat medium out of exhaust gas and air circulating through the second heat medium circuit 392 are different from each other.

By the circulation of exhaust gas through the reaction part side heat exchangers 34a, 34b, the catalysts 320a, 320b can be heated by the heat of exhaust gas at the reaction part side heat exchangers 34a, 34b. Therefore, in the case of the circulation of exhaust gas through the heat exchangers 34a, 34b, the reaction part side heat exchangers 34a, 34b serve as a heating unit that heats the catalysts 320a, 320b.

On the other hand, by the circulation of air through the reaction part side heat exchangers 34a, 34b, the air absorbs the heat of the catalysts 320a, 320b at the reaction part side heat exchangers 34a, 34b so as to cool the catalysts 320a, 320b. Accordingly, in the case of the circulation of air through the heat exchangers 34a, 34b, the reaction part side heat exchangers 34a, 34b serve as a cooling unit that cools the catalysts 320a, 320b.

By the circulation of exhaust gas through the removal part side heat exchangers 35a, 35b, the absorbents 330a, 330b can be heated by the heat of exhaust gas at the removal part side heat exchangers 35a, 35b. Accordingly, in the case of the circulation of exhaust gas through the heat exchangers 35a, 35b, the removal part side heat exchangers 35a, 54b serve as a heating unit that heats the absorbents 330a, 330b.

On the other hand, by the circulation of air through the removal part side heat exchangers 35a, 35b, the air absorbs the heat of the absorbents 330a, 330b at the removal part side heat exchangers 35a, 35b so as to cool the absorbents 330a, 330b. Accordingly, in the case of the circulation of air through the heat exchangers 35a, 35b, the removal part side heat exchangers 35a, 35b serve as a cooling unit that cools the absorbents 330a, 330b.

The reforming parts 3a, 3b of the reformer 3 are configured to perform two modes of an occlusion mode and a desorption mode. The occlusion mode is a mode whereby the absorbents 330a, 330b selectively occlude nitrogen at the removal parts 33a, 33b, and the heat that the absorbents 330a, 330b release is removed by the removal part side heat exchangers 35a, 35b through which air is circulating. The desorption mode is a mode whereby at the removal parts 33a, 33b, heat is given to the absorbents 330a, 330b by the removal part side heat exchangers 35a, 35b through which exhaust gas is circulating, and nitrogen is desorbed from the absorbents 330a, 330b.

The reforming parts 3a, 3b of the reformer 3 are configured such that in the occlusion mode, at the reaction parts 32a, 32b, heat is given to the catalysts 320a, 320b by the reaction part side heat exchangers 34a, 34b, through which exhaust gas is flowing, to reform ammonia so as to produce hydrogen and nitrogen. The reforming parts 3a, 3b of the reformer 3 are configured to cool the catalysts 320a, 320b by the reaction part side heat exchangers 34a, 34b, through which air is flowing, in the desorption mode.

In the present embodiment, along the first heat medium circuit 391, the second removal part side heat exchanger 35b is connected to a downstream side of the first reaction part side heat exchanger 34a in a flow direction, of the heat medium. Accordingly, when exhaust gas is flowing through the first heat medium circuit 391, i.e., when the desorption mode is executed at the second reforming part 3b, at the second removal part side heat exchanger 35b, the absorbent 330b is heated by exhaust heat after heating the catalyst 320a at the first reaction part side heat exchanger 34a.

Similarly, in the present embodiment, along the second heat medium circuit 392, the first removal part side heat exchanger 35a is connected to a downstream side of the second reaction, part side heat exchanger 34b in the flow direction of the heat medium. Accordingly, when exhaust gas is flowing through the second heat medium circuit 392, i.e., when the desorption mode is executed at the first reforming part 3a, at the first removal part side heat exchanger 35a, the absorbent 330a is heated by exhaust heat after heating the catalyst 320b at the second reaction part side heat exchanger 34b.

The reformer 3 is configured such that a mutually different mode out of the occlusion mode and desorption mode is performed between at the first reforming part 3a and the second reforming part 3b. More specifically, the reformer 3 is configured such that when the occlusion mode is executed at the first reforming part 3a, the desorption mode is executed at the second reforming part 3b, and that when the desorption mode is executed at the first reforming part 3a, the occlusion mode is executed at the second reforming part 3b.

The switching between the modes carried out at the reforming parts 3a, 3b is performed through control of the operations of the electric-type three-way valve 36, the first electric-type four-way valve 37, and the second electric-type four-way valve 38 by the control device. The operations of the first electric-type four-way valve 37 and the second electric-type four-way valve 38 are synchronized with the operation of the electric-type three-way valve 36.

Specifically, to switch into a circuit that makes ammonia flowing out of the carburettor 2 flow into the first reforming part 3a at the electric-type three-way valve 36, the circuit is switched at the first electric-type four-way valve 37 into the first circuit that simultaneously connects between the outlet side of the first reforming part 3a and the fuel inlet side of the engine EG, and between the outlet side of the second reforming part 3b and the exhaust port; and the circuit is switched at the second electric-type four-way valve 38 into the first circuit that simultaneously connects between the heat medium inlet side of the first reaction part side heat exchanger 34a of the first heat medium circuit 391 and the exhaust gas outlet side of the engine EG, and between the heat medium inlet side of the second reaction part side heat exchanger 34b of the second heat medium circuit 392 and the air inflow port.

On the other hand, to switch at the electric-type three-way valve 36 into a circuit that makes ammonia flowing out of the carburettor 2 flow into the second reforming part 3b, the circuit is switched at the first electric-type four-way valve 37 into the second circuit that simultaneously connects between the outlet side of the first reforming part 3a and the exhaust port, and between the outlet side of the second reforming part 3b and the fuel inlet side of the engine EG; and the circuit is switched at the second electric-type four-way valve 38 into the second circuit that simultaneously connects between the heat medium inlet side of the first reaction part side heat exchanger 34a of the first heat medium circuit 391 and the air inflow port, and between the heat medium inlet side of the second reaction part side heat exchanger 34b of the second heat medium circuit 392 and the exhaust gas outlet side of the engine EG.

In the present embodiment, the control device is configured such that when the occlusion mode is executed at one reforming part 3a of the two reforming parts 3a, 3b, and the desorption mode is executed at the other reforming part 3b, the modes of the reforming parts 3a, 3b are switched into modes different from their present modes after the nitrogen occluded in the absorbent 330b has been totally desorbed at the other reforming part 3b.

More specifically, nitrogen concentration sensors 39a, 39b that detect nitrogen concentrations in the fuel passages 310a, 310b are provided respectively for the reforming parts 3a, 3b. Through the detection of the nitrogen concentrations in the fuel passages 310a, 310b by these nitrogen concentration sensors 39a, 39b, it can be estimated whether the nitrogen occluded into the absorbents 330a, 330b has been totally desorbed.

For example, when the occlusion mode is executed at the first reforming part 3a, and the desorption mode is executed at the second reforming part 3b, the nitrogen concentration in the fuel passage 310b of the second reforming part 3b is detected by the nitrogen concentration sensor 39b; and if the control device determines based on a result of this detection that the nitrogen occluded into the absorbent 330b of the second reforming part 3b has been totally desorbed, the control device switches the electric-type three-way valve 36, the first electric-type four-way valve 37, and the second electric-type four-way valve 38 so as to perform the desorption mode at the first reforming part 3a and the occlusion mode at the second reforming part 3b.

A speed of the occlusion of nitrogen and a speed of the desorption of nitrogen in the absorbents 330a, 330b are not necessarily the same. Nevertheless, through control of heat inputs into the absorbents 330a, 330b at the removal part side heat exchangers 35a, 35b, the speeds of the occlusion and desorption of nitrogen can be controlled.

Next, detailed configurations of the reforming parts 3a, 3b will be described. Because the first reforming part 3a and the second reforming part 3b have similar configurations, in the following description, the first reforming part 3a will be explained, and an explanation of the second reforming part 3b will be omitted.

Figure 3:
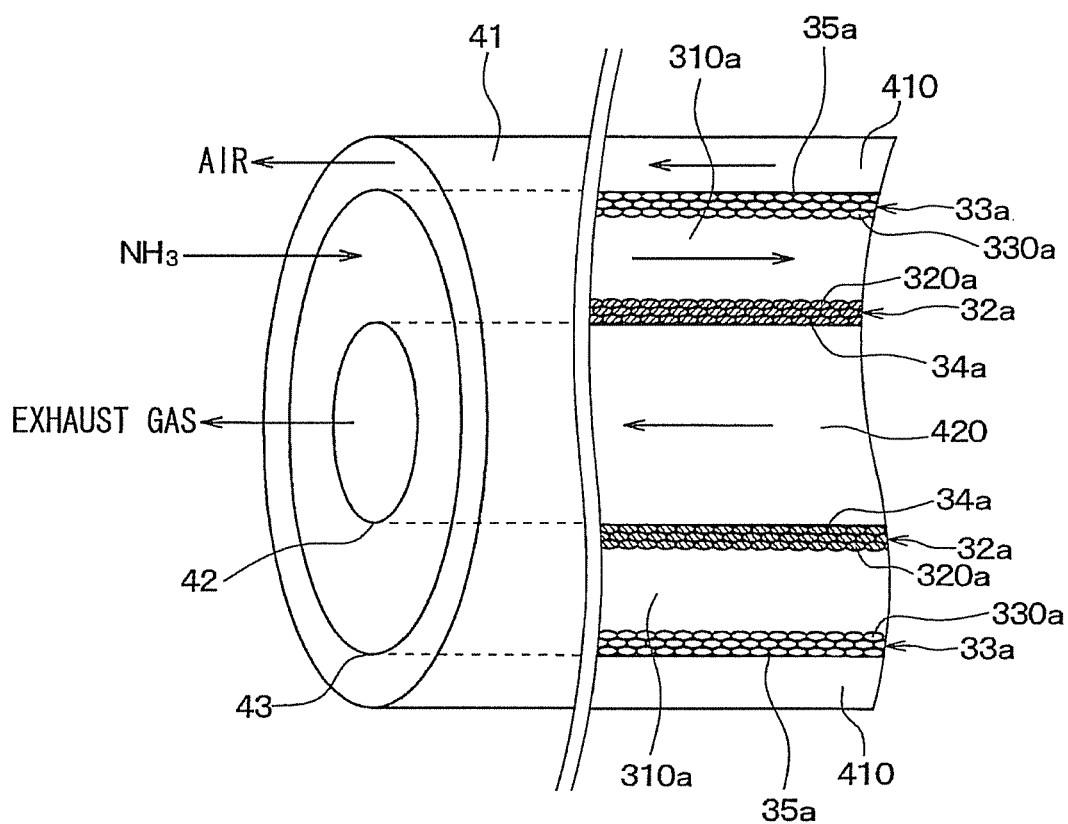
FIG. 3 is a partially transparent perspective view illustrating a first reforming part according to the embodiment.

As illustrated in FIG. 3, the first reforming part 3a has a treble pipe structure. More specifically, the first reforming part 3a includes an outer pipe 41 that defines a first heat medium passage 410 through which one heat medium of exhaust gas and air flows, an inner pipe 42 that is located inward of the outer pipe 41 and defines a second heat medium passage 420 through which the other heat medium of exhaust gas and air flows, and an intermediate pipe 43 that is located between the outer pipe 41 and the inner pipe 42 and defines the fuel passage 310a.

The catalyst 320a is disposed on an outer wall surface of the inner pipe 42, i.e., surface of the pipe 42 opposed to the fuel passage 310a, thereby forming the reaction part 32a. The catalyst 320a is configured to be capable of exchanging heat with the heat medium flowing in the second heat medium passage 420 through the outer wall surface of the inner pipe 42. Accordingly, the outer wall surface of the inner pipe 42 serves as the reaction part side heat exchanger 34a.

The absorbent 330a is disposed on an inner wall surface of the intermediate pipe 43, i.e., surface of the pipe 43 opposed to the fuel passage 310a, thereby forming the removal part 33a. The absorbent 330a is configured to be capable of exchanging heat with the heat medium flowing in the first heat medium passage 410 through the inner wall surface of the intermediate pipe 43. Accordingly, the inner wall surface of the intermediate pipe 43 serves as the removal part side heat exchanger 35a.

As described above, nitrogen is selectively occluded into the absorbents 330a, 330b at the removal parts 33a, 33b; and at the same time, the heat released by the absorbents 330a, 330b is removed by the removal part side heat exchangers 35a, 35b. As a result, nitrogen can be separated and removed without use of a permeable film. Therefore, because the permeable film is not used, despite a large flow rate or high pressure of fuel, the removal parts 33a, 33b are not damaged, and a separation removal function can be secured. In other words, because the permeable film is not used, it is rendered unnecessary to increase in size the entire reformer 3 in order to secure the separation removal function.

In addition, because the permeable film is not used, the seal between the permeable film and a frame body is rendered unnecessary to avoid the trouble of the sealing, and the production costs can thereby be reduced. In the present embodiment, the absorbents 330a, 330b are disposed in the fuel passages 310a, 310b to be in direct contact with nitrogen. Thus, since it is unnecessary to provide a contact part between the absorbents 330a, 330b and outside of the system (exterior), the seal can be reliably performed.

Furthermore, the conventional permeable film is generally made of precious metal. Through use of the absorbents 330a, 330b instead of this permeable film, nitrogen can be separated and removed. Accordingly, the production costs can be further reduced.

Thus, the reformer 3 can be downsized and its production costs can be reduced.

In the present embodiment, along the first heat medium circuit 391 and the second heat medium circuit 392, the reaction part side heat exchangers 34a, 34b are arranged on the upstream side of the removal part side heat exchangers 35a, 35b in the flow direction of the heat medium. Accordingly, at the removal part side heat exchangers 35a, 35b, in the desorption mode, the absorbents 330a, 330b are heated by the exhaust heat after heating the catalysts 320a, 320b.

Therefore, at the reaction part side heat exchangers 34a, 34b, the catalysts 320a, 320b are heated first by the heat (exhaust heat) of exhaust gas of the engine EG. Consequently, the catalysts 320a, 320b can sufficiently be heated. Then, the absorbents 330a, 330b are heated at the removal part side heat exchangers 35a, 35b by the exhaust heat after heating the catalysts 320a, 320b. As a result, it becomes possible to use the exhaust heat of the engine EG effectively.

Moreover, in the present embodiment, the mutually different mode out of the occlusion mode and desorption mode is performed between at the first reforming part 3a and the second reforming part 3b. Accordingly, the desorption mode can be carried out without fail at either one of the first reforming part 3a and the second reforming part 3b. For this reason, nitrogen can be desorbed constantly from either one of the first reforming part 3a and the second reforming part 3b to be supplied to the engine EG.

By switching the heat medium supplied to the reaction part side heat exchangers 34a, 34b and the removal part side heat exchangers 35a, 35b, between exhaust gas and air, the mode executed at the first reforming part 3a and the second reforming part 3b can be switched between the occlusion mode and desorption mode. Accordingly, the mode executed at the first reforming part 3a and the second reforming part 3b can be switched using a simplified configuration.

In the present embodiment, the first reforming part 3a and the second reforming part 3b are configured to have a treble pipe structure. Accordingly, by switching the heat media supplied to the first heat medium passage 410 and the second heat medium passage 420 between exhaust gas and air, the modes executed at the first reforming part 3a and the second reforming part 3b can be switched between the occlusion mode and desorption mode. Thus, the configuration whereby the mode executed at the first reforming part 3a and the second reforming part 3b can be switched between the occlusion mode and desorption mode can be easily and reliably realized.

Modifications of the above embodiment will be described. The disclosure is not limited to the above embodiment, and, without departing from the scope of the disclosure, may be modified variously as follows.

(1) In the above embodiment, the removal part side heat exchangers 35a, 35b are employed for the cooling unit that cools the absorbents 330a, 330b and the heating unit that heats the absorbents 330a, 330b. It is illustrated that the absorbents 330a, 330b are cooled or heated by switching the heat media flowing through the removal part side heat exchangers 35a, 35b. However, in addition to this, respectively different heat exchangers (e.g., a heat exchanger for cooling and a heat exchanger for heating) may be employed as the cooling unit and the heating unit.

Similarly, the reaction part side heat exchangers 34a, 34b are employed for the cooling unit that cools the catalysts 320a, 320b and the heating unit that heats the catalysts 320a, 320b. It is illustrated that the catalysts 320a, 320b are cooled or heated by switching the heat media flowing through the reaction part side heat, exchangers 34a, 34b. However, respectively different heat exchangers may be employed for the cooling unit and the heating unit.

(2) In the above embodiment, it is illustrated that the reformer 3 is configured such that the mutually different mode out of the occlusion mode and desorption mode is performed between at the first reforming part 3a and the second reforming part 3b. However, instead of this, the reformer 3 may be configured such that mutually the same mode is executed at the first reforming part 3a and the second reforming part 3b.

(3) In the above embodiment, it is illustrated that the reformer 3 is configured to include the two reforming parts (i.e., the first reforming part 3a and the second reforming part 3b). However, instead of this, there may be one reforming part, or three reforming parts or more may be provided.

To sum up, the reactor 3 of the above embodiment can be described as follows.

A reactor 3 includes a reaction part 32a, 32b and a removal part 33a, 33b. The reaction part 32a, 32b is configured to generate at least two products as a result of a reaction of an unreacted material. The removal part 33a, 33b is configured to selectively occlude at least one product from the at least two products so as to separate and remove the at least one product. The removal part 33a, 33b includes an absorbent 330a, 330b and a cooling unit 35a, 35b. The absorbent 330a, 330b releases heat at time of the selective occlusion of the at least one product. The cooling unit 35a, 35b is configured to remove the heat released by the absorbent 330a, 330b.

Accordingly, at the removal part 33a, 33b, at least one product is selectively occluded into the absorbent 330a, 330b, and at the same time, the heat released by the absorbent 330a, 330b is removed by the cooling unit 35a, 35b. As a result, at least one product can be separated and removed without use of a permeable film. Therefore, because the permeable film is not used, despite a large flow rate or high pressure of the unreacted material, the removal part 33a, 33b is not damaged, and a separation removal function can be secured. In other words, because the permeable film is not used, it is rendered unnecessary to increase in size the entire reactor in order to secure the separation removal function.

In addition, because the permeable film is not used, the seal between the permeable film and a frame body is rendered unnecessary to avoid the trouble of the sealing, and the production costs can thereby be reduced. Furthermore, the conventional permeable film is generally made of precious metal. Through use of the absorbent 330a, 330b instead of this permeable film, at least one product can be separated and removed. Accordingly, the production costs can be further reduced.

Thus, the reactor can be downsized and its production costs can be reduced.

The selective occlusion of at least one product from at least two products means that N (N: integer that is equal to or larger than 1 and equal to or smaller than (M−1)) product(s) is (are) selectively occluded from M (M: integer that is 2 or more) products.

The reaction part 32a, 32b may include at least two small reaction parts 32a, 32b. The removal part 33a, 33b may be provided for each of the at least two small reaction parts 32a, 32b and include: the absorbent 330a, 330b that releases heat at time of the selective occlusion of the at least one product and absorbs heat at time of desorption of the occluded at least one product; the cooling unit 35a, 35b that removes the heat released by the absorbent 330a, 330b; and a heating unit 35a, 35b that is configured to give heat to the absorbent 330a, 330b. The removal part 33a, 33b may be configured to be capable of performing: an occlusion mode in which the absorbent 330a, 330b selectively occludes the at least one product and the cooling unit 35a, 35b removes the heat released by the absorbent 330a, 330b; or a desorption mode in which the heating unit 35a, 35b gives heat to the absorbent 330a, 330b and the at least one product is desorbed from the absorbent 330a, 330b.

Accordingly, the occlusion mode or desorption mode can be executed at each of the removal parts 33a, 33b provided respectively for the small reaction parts 32a, 32b. Therefore, occlusion and desorption of at least one product can be carried out at desired timing.

The reactor 3 may be adapted for a fuel supply system 10 that supplies fuel to an energy output unit EG which outputs energy through oxidation of hydrogen or fuel, which molecule has at least one hydrogen atom. Each of the at least two small reaction parts 32a, 32b may be configured to react fuel to generate hydrogen and a product other than hydrogen. In the desorption mode, the heating unit 35a, 35b may heat the absorbent 330a, 330b by heat produced at time of the oxidation of hydrogen or fuel in the energy output unit EG.

Each of the at least two small reaction parts 32a, 32b may include a catalyst 320a, 320b that reforms fuel to generate hydrogen. In the occlusion mode, the catalyst 320a, 320b may be heated by heat produced at time of the oxidation of hydrogen or fuel in the energy output unit EG. In the desorption mode, the heating unit 35a, 35b may heat the absorbent 330a, 330b by exhaust heat after the heating of the catalyst 320a, 320b.

Accordingly, the catalyst 320a, 320b is heated first by the heat produced when oxidizing fuel or hydrogen at the energy output unit EG. As a result, the catalyst 320a, 320b can sufficiently be heated. Because the absorbents 330a, 330b are heated by exhaust heat after heating the catalyst 320a, 320b, the heat produced when oxidizing fuel or hydrogen at the energy output unit EG can be effectively used.

The at least two small reaction parts 32a, 32b may include two small reaction parts 32a, 32b. The removal part 33a, 33b may be one of two removal parts 33a, 33b each of which is provided for a corresponding one of the two small reaction parts 32a, 32b. The two removal parts 33a, 33b include one removal part 33a and the other removal part 33b. The occlusion mode is performed at the one removal part 33a and the desorption mode is performed at the other removal part 33b, or the occlusion mode is performed at the other removal part 33b and the desorption mode is performed at the one removal part 33a. Each of the two small reaction parts 32a, 32b may include a first heat exchanger 34a, 34b that is configured to heat or cool the catalyst 320a, 320b through a heat exchange between the catalyst 320a, 320b and a heat medium. Each of the two removal parts 33a, 33b may include a second heat exchanger 35a, 35b that is, configured to heat or cool the absorbent 330a, 330b through a heat exchange between the absorbent 330a, 330b and a heat medium. A heat medium for heating or a heat medium for cooling may be supplied to the first heat exchanger 34a, 34b and the second heat exchanger 35a; 35b as the heat medium. By switching the heat media supplied to the first heat exchanger 34a, 34b and the second heat exchanger 35a, 35b alternately between the heat medium for heating and the heat medium for cooling, the modes performed at the one removal part 33a and the other removal part 33b are switched between the occlusion mode and the desorption mode.

Accordingly, the mutually different mode out of the occlusion mode and desorption mode is performed between at one removal part 33a and the other removal part 33b. As a result, the desorption mode can be carried out without fail at either one of one removal part 33a and the other removal part 33b. For this reason, from either one of one removal part 33a and the other removal part 33b, at least one product can be desorbed constantly to be supplied to the energy output unit EG.

By switching the heat media supplied to the first heat exchangers 34a, 34b and the second heat exchangers 35a, 35b between the heat medium for heating and the heat medium for cooling, the modes executed at one removal part 33a and the other removal part 33b can be switched between the occlusion mode and desorption mode. Accordingly, the mode executed at one removal part 33a and the other removal part 33b can be switched using a simplified configuration.

Each of the two small reaction parts 32a, 32b may include: an outer pipe 41 that defines a first heat medium passage 410 through which one of the heat medium for heating and the heat medium for cooling flows; an inner pipe 42 that is arranged inward of the outer pipe 41 and defines a second heat medium passage 420 through which the other one of the heat medium for heating and the heat medium for cooling flows; and an intermediate pipe 43 which is arranged between the outer pipe 41 and the inner pipe 42 and through which fuel flows. The catalyst 320a, 320b may be disposed on an outer wall surface of the inner pipe 42. The absorbent 330a, 330b may be disposed on an inner wall surface of the intermediate pipe 43.

Accordingly, since at least two small reaction parts 32a, 32b has a treble tube structure, by switching the heat media supplied to the first heat medium passage 410 and the second heat medium passage 420 between the heat medium for heating and the heat medium for cooling, the modes executed at one removal part 33a and the other removal part 33b can be switched between the occlusion mode and desorption mode. Thus, a configuration whereby the modes executed at one removal part 33a and the other removal part 33b can be switched between the occlusion mode and desorption mode can be easily and reliably achieved.

The reaction part 32a, 32b may be configured to generate nitrogen and a product other than nitrogen as a result of a reaction of an unreacted material whose molecule has at least one nitrogen atom. The removal part 33a, 33b may selectively occlude nitrogen due to physical adsorption of nitrogen or fixation reaction of nitrogen.

The unreacted material may be ammonia. The reaction part 32a, 32b may include a catalyst 320a, 320b that reforms ammonia to generate hydrogen.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A reactor comprising:
    a reaction part generating at least two products as a result of a reaction of an unreacted material, the reaction part including:
        a catalyst generating the at least two products as a result of the reaction of the unreacted material; and
        a reaction part side heat exchanger exchanging heat with the reaction part; and
    a removal part selectively occluding at least one product from the at least two products so as to separate and remove the at least one product, the removal part including:
        an absorbent selectively occluding the at least one product and releasing heat at a time of the selective occluding of the at least one product; and
        a removal part side heat exchanger exchanging heat with the removal part, wherein the removal part side heat exchanger:
        removes the heat released by the absorbent at the time of the selective occluding of the at least one product; and
        gives heat to the absorbent when the absorbent releases the at least one product occluded by the absorbent.

2. The reactor according to claim 1, wherein:
    the reaction part includes at least two small reaction parts;
    the removal part is provided for each of the at least two small reaction parts and includes:
    the absorbent that releases heat at the time of the selective occluding of the at least one product absorbs heat at time of a desorption of the occluded at least one product;
    the removal part side heat exchanger removes the heat released by the absorbent; and
    a heating unit giving heat to the absorbent; and
    the removal part performs:
    an occlusion mode in which the absorbent selectively occludes the at least one product and the cooling unit removes the heat released by the absorbent; or
    a desorption mode in which the heating unit gives heat to the absorbent and the at least one product is desorbed from the absorbent.

3. The reactor according to claim 2, wherein:
    the reactor is adapted for a fuel supply system that supplies fuel to an energy output unit which outputs energy through oxidation of hydrogen or fuel, which molecule has at least one hydrogen atom;
    each of the at least two small reaction parts reacts fuel to generate hydrogen and a product other than hydrogen; and in the desorption mode, the heating unit heats the absorbent by heat produced at a time of the oxidation of hydrogen or fuel in the energy output unit.

4. The reactor according to claim 3, wherein:
each of the at least two small reaction parts includes a catalyst reforming fuel to generate hydrogen;
in the occlusion mode, the catalyst is heated by heat produced at time of the oxidation of hydrogen or fuel in the energy output unit; and
in the desorption mode, the heating unit heats the absorbent by exhaust heat after the heating of the catalyst.

5. The reactor according to claim 4, wherein:
the at least two small reaction parts include two small reaction parts;
the removal part is one of two removal parts each of which is provided for a corresponding one of the two small reaction parts, the two removal parts including one removal part and the other removal part;
the occlusion mode is performed at the one removal part and the desorption mode is performed at the other removal part, or the occlusion mode is performed at the other removal part and the desorption mode is performed at the one removal part;
each of the two small reaction parts includes a first heat exchanger heating or cooling the catalyst through a heat exchange between the catalyst and a heat medium;
each of the two removal parts includes a second heat exchanger heating or cooling the absorbent through a heat exchange between the absorbent and a heat medium;
a heat medium for heating or a heat medium for cooling is supplied to the first heat exchanger and the second heat exchanger as the heat medium; and
by switching the heat media supplied to the first heat exchanger and the second heat exchanger alternately between the heat medium for heating and the heat medium for cooling, the modes performed at the one removal part and the other removal part are switched between the occlusion mode and the desorption mode.

6. The reactor according to claim 5, wherein:
each of the two small reaction parts includes:
an outer pipe that defines a first heat medium passage through which one of the heat medium for heating and the heat medium for cooling flows;
an inner pipe that is arranged inward of the outer pipe and defines a second heat medium passage through which the other one of the heat medium for heating and the heat medium for cooling flows; and
an intermediate pipe which is arranged between the outer pipe and the inner pipe and through which fuel flows;
the catalyst is disposed on an outer wall surface of the inner pipe; and
the absorbent is disposed on an inner wall surface of the intermediate pipe.

7. The reactor according to claim 1, wherein:
the reaction part generates nitrogen and a product other than nitrogen as a result of a reaction of an unreacted material which molecule has at least one nitrogen atom; and
the removal part selectively occludes nitrogen due to physical adsorption of nitrogen or fixation reaction of nitrogen.

8. The reactor according to claim 7, wherein:
the unreacted material is ammonia; and
the reaction part includes a catalyst that reforms ammonia to generate hydrogen.

* * * * *